United States Patent [19]

Ostermeyer et al.

[11] Patent Number: 4,787,479
[45] Date of Patent: Nov. 29, 1988

[54] CONTROL SYSTEM FOR A CENTRAL LUBRICATION SYSTEM FOR VEHICLE

[75] Inventors: Günter Ostermeyer, Walldorf; Karl Rodemer, Heidelberg; Peter Steiger, Schriesheim, all of Fed. Rep. of Germany

[73] Assignee: Lincoln GmbH, Walldorf, Fed. Rep. of Germany

[21] Appl. No.: 92,879

[22] Filed: Sep. 3, 1987

[30] Foreign Application Priority Data

Sep. 5, 1986 [DE] Fed. Rep. of Germany ....... 3630327

[51] Int. Cl.$^4$ ............................................. F16N 7/38
[52] U.S. Cl. .................................................. 184/7.2
[58] Field of Search .......................... 184/7.2, 7.3, 7.4

[56] References Cited

U.S. PATENT DOCUMENTS

| 1,987,256 | 1/1935 | Johnson, Jr. et al. | 184/7.2 |
| 2,076,977 | 4/1937 | Bush | 184/7.2 |
| 2,577,658 | 12/1951 | Kenoszt | 184/7.2 |
| 2,845,142 | 7/1958 | Schneller | 184/7.4 |
| 3,022,863 | 2/1962 | Sensui et al. | 184/7.2 |
| 3,109,513 | 11/1963 | Shakely | 184/7.2 X |
| 3,367,446 | 2/1968 | Higgins | 184/7.2 |
| 3,527,322 | 9/1970 | Roberts | 184/7.4 |
| 4,147,233 | 4/1979 | Smith | 184/7.2 X |

FOREIGN PATENT DOCUMENTS 48406 6/1984 Japan .................................... 184/7.4

Primary Examiner—Leonard E. Smith
Attorney, Agent, or Firm—Wenderoth, Lind and Ponack

[57] ABSTRACT

A control system for a central lubrication system with an electrically operated lubrication pump for vehicles without their own power source, such as trailers, carriers for utility vehicle, etc., includes an electrical time-controlling device to activate the lubrication pump as a function of the operating time of the vehicle. Power is supplied to the time-controller device and the drive motor for the lubrication pump via the feed lines for the brake light. The time-controlling device has a sensor which detects motion of the vehicle or parts of the vehicle and generates a signal for a second timer during such motion. The second timer adds the durations of the signals sent from the sensor, compares the sum of the durations to a predefined pause time and, when the predefined pause time is exceeded, sends a signal to a third timer, which is thus enabled and in turn sends an enable signal for the activation of the drive motor of the lubrication pump during the next braking operation; the third timing signal adds the durations of successive braking operations during which the drive motor of the lubrication pump is activated, compares the sum of the durations with a predefined operating time and, upon reaching the predefined operating time, sends a signal to the second timer, whereby the enable signal sent from the second timer, and consequently also the enable signal for the activation of the drive motor of the lubrication pump, are cancelled.

12 Claims, 1 Drawing Sheet

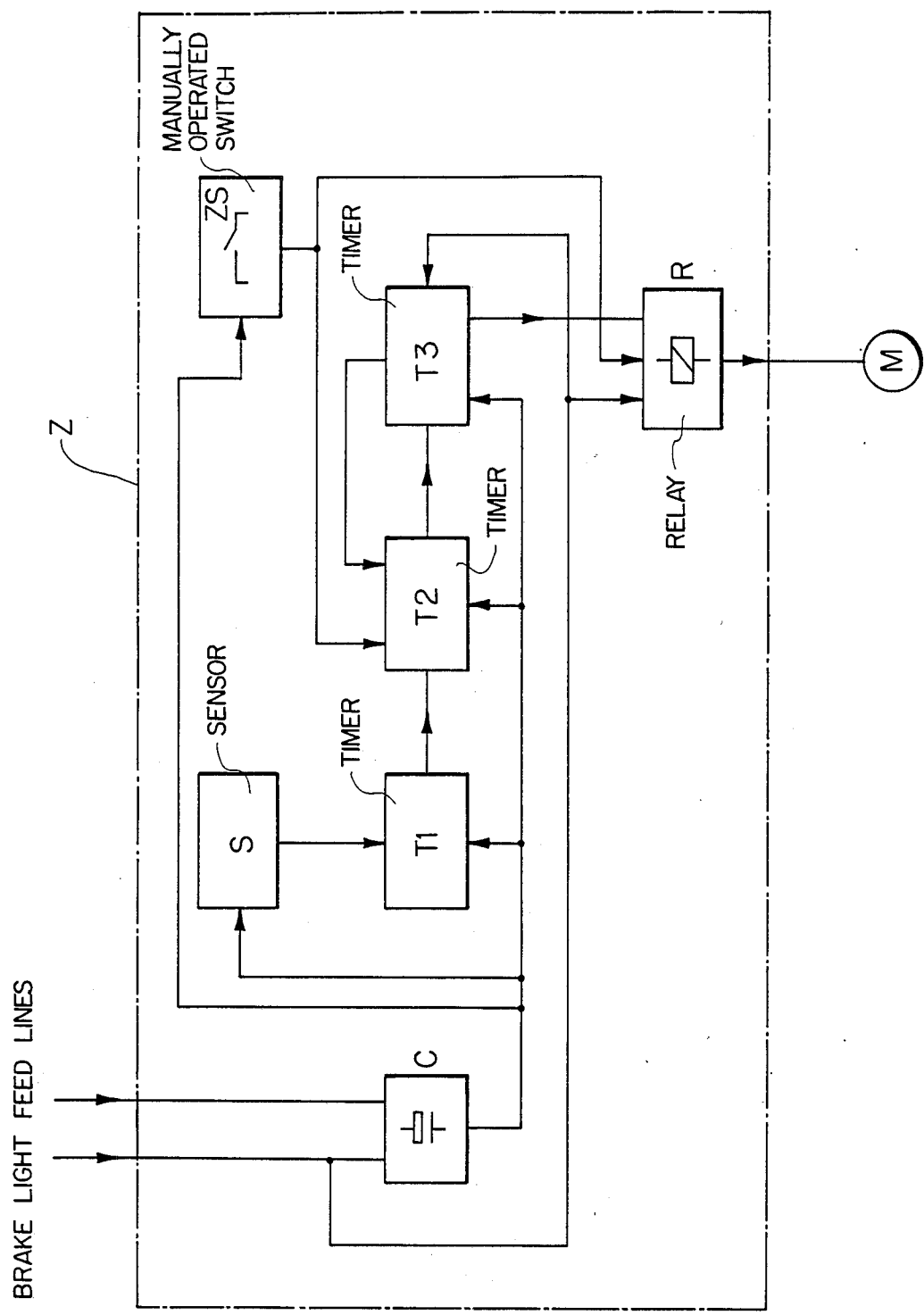

CONTROL SYSTEM FOR A CENTRAL LUBRICATION SYSTEM FOR VEHICLE

BACKGROUND OF THE INVENTION

The present invention relates to a control system for a central lubrication system with an electrically operated lubrication pump for vehicles which do not have their own power source, such as trailers, carriers for utility vehicles, etc., and includes a time-controlling device for activating the lubrication pump as a function of the operating time of the vehicle.

The optimal solution is one in which the lubrication of the decentralized lubrication points of said vehicle takes place in proportion to the actual operating time, i.e., the time during which the vehicle is in operation.

In the past, many attempts have been made to approach this problem. For example, an attempt was made to operate the lubrication pump directly based on the travel of the wheel suspension system. This solution requires a relatively large expenditure and is susceptible to wear, and is possible only with pneumatically or hydraulically operated lubrication pumps, but not with electrically operated lubrication pumps.

In another attempted solution, the number of wheel revolutions is measured and, upon reaching a predefined number of revolutions, the central lubrication system is activated pneumatically.

In yet another proposed solution, the number of braking operations is determined and, upon reaching a predefined number, the central lubrication system is activated pneumatically.

It was also proposed that the central lubrication system be activated electrically with every braking operation. In this case, the extend of lubrication cannot be controlled and depends on the driving habits of the driver and the conditions along the route being travelled.

More favorable results can be achieved if lubrication with every braking operation is time-limited.

Furthermore, a proposal was made to lubricate said vehicles strictly on a time-controlled basis. In this case, however, there is no dependency whatsoever on the operating time of the vehicle.

SUMMARY OF THE INVENTION

The object of the present invention, therefore, is to provide a control system for a central lubrication system of the type described, in which simple and reliable means are used to ensure that the operating times of the central lubrication system are in proportion to the actual (absolute) operating time of the vehicle.

According to the present invention, this problem is solved by a control system for a central lubrication system of the type described which incorporates the following features:

1—The power to the time-controlling device and the drive motor is supplied via the brake light feed lines.

2—The time-controlling device has a sensor that detects oscillations, vibrations or other motions of the vehicle or parts of the vehicle, and consequently generates a signal, directly or indirectly, for a second timer while the vehicle is moving.

3—The second timer adds the time values of the signals sent directly or indirectly from the sensor, compares the sum of the time values with a predefined time value (pause time) and, if said predefined time value is exceeded, sends a signal to a third timer, which is thereby enabled and in turn sends an enable signal for the activation of the drive motor of the lubrication pump during the next braking operation.

4—The third timer adds the time durations of successive braking operations during which the drive motor of the lubrication pump is activated, compares the sum of the durations with a predefined time (operating time) and, when said predefined operating time is reached, sends a signal to the second timer, whereupon the enable signal sent from the second timer and also the enable signal for the activation of the drive motor are cancelled.

The first feature of the present invention makes it possible to utilize the power supply of the pulling vehicle, which must be available in any case for the brake lights of a trailer, carrier or similar vehicle without its own power supply, to supply the power to the time-controlling device and the drive motor for the lubrication pump.

The second feature ensures that while the vehicle is being utilized, i.e., while it is in motion, a signal is sent which indicates this state of motion. This forms the basis for the determination of the actual (absolute) operating time of the vehicle. Sensors used in these applications include, for example, a means for sensing the rotation of the wheels, a means for determining the motion of specific vehicle parts, such as a trailer fork, for example, a means for determining the motion of the wheel suspension, etc., and particularly vibration sensors (such as mercury switches), since the latter can be arranged at any location on the vehicle being pulled (protected) and immediately adjacent to or integrated with the time-controlling device.

The third feature of the present invention concerns the determination of the accumulated operating time of the vehicle and comparison with a predefined or variable pause time, after which a lubrication cycle is to be (re)initiated. The lubrication cycle itself, according to the last feature of the present invention, is initiated during the next braking operation, and the duration of said lubrication cycle is limited by a predefined or variable operating time, after which the lubrication cycle is terminated, and is independent of the length of the braking operation, and is not initiated again until after the next pause time.

With this control system for a central lubrication system, therefore, relatively simple means are used to provide a reliable and extraordinarily accurate measure of the pause times and operating times with respect to the operating time of the trailing vehicle.

In a modification of the present invention, a first time can be connected between the sensor and the second timer, whereby said first timer, upon receiving a motion-dependent signal from the sensor, sends an output signal of predefined duration to the second timing signal. This proposal is of particular interest if a vibration sensor is used as the sensor for detecting the motion of the trailing vehicle, because such vibration sensors generate relatively short pulses in response to oscillations and vibrations of the vehicle, and the interpulse periods are bridged by the duration of the output signal triggered by the first timer, so that the second timer continuously receives a signal indicating the operational status of the trailing vehicle.

In a particularly advantageous modification of the present invention, the supply voltage of the time-controlling device is obtained from a buffer capacitor or battery, which is charged via the brake light feed lines during the corresponding braking operation. This makes it unnecessary to have a separate power source for the time-controlling device.

So that lubrication can also be initiated arbitrarily and independent of the operating time, using the central lubrication system according to the present invention, in a further advantageous development the time-controlling device is equipped with a switch which, when activated manually, supplies an enable signal for the activation of the drive motor of the lubrication pump upon simultaneous activation of the brakes.

Advantageously, upon the manual activation of the switch, a reset signal for the accumulated operating time is simultaneously sent to the second timer, so that a new lubrication cycle is not initiated until the entire pause time has elapsed.

Additional objectives, features, advantages and applications of the present invention become evident from the following description of an embodiment of the invention and the accompanying drawings.

BRIEF DESCRIPTION OF THE DRAWINGS

The single FIGURE illustrates a block diagram of the time-controlling device of the central lubrication system in accordance with the present invention.

DESCRIPTION OF THE PREFERRED EMBODIMENT

The power supply of the time-controlling device Z and the drive motor M for the lubrication pump is obtained from the feed lines to the brake lights. The supply voltage to the individual electronic components of the time-controlling device Z is obtained from a buffer capacitor C, which is charged during every braking operation. In this way, the required supply voltage is always available. As shown in the drawing, the supply voltage is supplied to a sensor S for the determination of the state of motion of the trailing vehicle, three timers T1, T2 and T3 arranged in succession, and a manually operated switch ZS. The sensor S may be a commercially available device from Messrs. Günter, W. Germany, part no. 1203704002 and the three timers T1-T3 may be commercially available devices from Motorola, Inc. part no. MC 140 20B.

The illustrated time-controlling device of the central lubrication system operates in the following manner:

The sensor S, preferably a vibration sensor, detects the oscillations and vibrations occurring in a trailing vehicle which is in motion. This motion causes the sensor S to send a pulse to the first timer T1, whereupon said first timer sends a signal to a second timer T2 during a predefined, variable time t1. The duration of the signal enabled with every input pulse from the sensor S serves to bridge the interpulse periods, so that a constant signal is supplied to the second timer T2 during the operating time of the trailer. The first timer T1 begins anew during every vibration of the vehicle.

When the vehicle is at rest, and upon expiration of the preset time period, timer T1 switches to the starting position, whereby no output signal is sent to timer T2. As soon as timer T1 is started due to the vibrations of the moving vehicle, an input signal is once again supplied to timer T2. Timer T2 adds the durations of the signals sent from timer T1 and compares them with a predefined pause time t2. When the vehicle is at rest, the expiration of timer T1 also results in the stoppage of timer T2, i.e., the pause time. The previously accumulated pause time is stored, however, If the vehicle begins to move again, the sensor causes timer T1 to start again, and the pause time resumes from the point of interruption in timer T2. Upon reaching the preset pause time t2, timer T2 sends a signal to the third timer T3. This timer T3 is thus enabled and sends an enable signal to the output relay R.

During the next braking operation, the output relay R responds and the drive motor M of the central lubrication system is activated. Because timer T3 is enabled, it measures the duration of the braking operation and compares it to a preset operating time t3. If the braking operation is shorter than the operating time t3, the recorded activation time of the brakes is stored at the end of the braking operation and resumes with the next braking operation. The adding of braking times continues until the predefined operating time t3 is reached and exceeded.

Upon reaching the operating time t3, timer T3 sends a signal to timer T2 and switches the latter to the starting position, so that the enable signal sent from timer T2 to timer T3, and thus to the relay R, is cancelled and the lubrication process is terminated.

The process of adding operating times in timer T2 via timer T1 then begins anew, and continues until the predefined pause time t2 is reached again, etc.

If the duration of the braking operation is greater than or equal to the set operating time t3, or if the total of the braking times exceeds the operating time t3 during the last braking operation, the lubrication process continues until the end of the operating time t3.

As mentioned earlier, however, upon expiration of the operating time t3, the measurement of the operating time of the trailing vehicle and the comparison with the pause time stored in timer T2 begin anew.

This arrangement ensures that by monitoring the operating time of the trailing vehicle, lubrication takes place only after predefined intervals (pause times) and for a predefined duration.

To facilitate maintenance-related lubrication while the vehicle is at rest, the described time-controlling device has a manually operated switch ZS. When the switch ZS is activated, an enable signal is sent to the relay R, and supplementary lubrication is initiated by activating the brake. At the same time, according to the representation, a reset signal is sent to timer T2, so that the accumulated operating time is reset, i.e., timer T2 is set back to its starting position and the next lubrication cycle takes place only after expiration of the entire pause time t2.

If a sensor S is used which itself generates a continuous signal based on the operating time, timer T1 can be omitted and the constant signal generated by the sensor S can be sent directly to timer T2. This is the case, for example, if the sensor S detects wheel revolutions. Obviously, the switch ZS is also not absolutely necessary to realize the fundamental idea of the present invention, but it does improve the practicability of the solution according to the present invention.

We claim:

1. A control system for a central lubrication system for a powerless vehicle having an electrically operated lubrication pump and having electrical power externally supplied thereto via brake light feed lines, said control system comprising:
   a sensor means for detecting movement of the vehicle and for generating an output signal in response thereto;

a first timer means for receiving said output signal from said sensor means and for adding the durations of said output signal from said sensor means and for comparing the resultant sum with a predefined pause time and for providing an output signal when said sum is greater than said predefined pause time;

a second timer means connected to a relay means which is in turn connected to the electrically operated lubrication pump and the brake light feed lines for receiving said output signal from said first timer means and for connecting the electrically operated lubrication pump to the brake light feed lines in response thereto and for adding the durations of said output signal from said first timer means and for comparing the resultant sum with a predefined operating time and for generating an output signal when said sum is equal to said operating time, said output signal of said second timer means being sent to said first timer means so as to reset said first timer means and thereby also reset said second timer means so as to disconnect the electrically operated lubrication pump from the brake light feed lines.

2. A control system as recited in claim 1, further comprising a manually operated switch for providing a signal to said first timer means and relay means for connecting the electrically operated lubrication pump to the brake light feed lines in response thereto.

3. A control system as recited in claim 2, wherein said signal from said manually operated switch resets said first timer means such that the sum of said first timer means is made equal to zero.

4. A control system as recited in claim 1, further comprising an energy storage means connected to the brake light feed lines for supplying electrical power to said control means.

5. A control system as recited in claim 4, further comprising a manually operated switch for providing a signal to said first timer means and relay means for connecting the electrically operated lubrication pump to the brake light feed lines in response thereto.

6. A control system as recited in claim 5, wherein said signal from said manually operated switch resets said first timer means such that the sum of said first timer means is made equal to zero.

7. A control system as recited in claim 1, wherein said sensor means includes a motion dependent signal generator means and another timer means for generating said sensor output signal so as to have a predetermined length upon receiving an output signal from said motion dependent signal generator means whose signal is generated in response to movement by the vehicle.

8. A control system as recited in claim 7, further comprising a manually operated switch for providing a signal to said first timer means and relay means for connecting the electrically operated lubrication pump to the brake light feed lines in response thereto.

9. A control system as recited in claim 8, wherein said signal from said manually operated switch resets said first timer means such that the sum of said first timer means is made equal to zero.

10. A control system as recited in claim 7, further comprising an energy storage means connected to the brake light feed lines for supplying electrical power to said control means.

11. A control system as recited in claim 10, further comprising a manually operated switch for providing a signal to said first timer means and relay means for connecting the electrically operated lubrication pump to the brake light feed lines in response thereto.

12. A control system as recited in claim 11, wherein said signal from said manually operated switch resets said first timer means such that the sum of said first timer means is made equal to zero.

* * * * *